United States Patent
Humpston et al.

(10) Patent No.: US 7,026,744 B2
(45) Date of Patent: Apr. 11, 2006

(54) REMOTE CONTROL AND POWER SYSTEM

(75) Inventors: Giles Humpston, Aylesbury (GB); Anthony Patrick Needham, Byheld (GB); Anthony John Salloway, Weston Favell (GB)

(73) Assignee: Bookham Technology, PLC, Northants (GB)

(*) Notice: Subject to any disclaimer, the term of this patent is extended or adjusted under 35 U.S.C. 154(b) by 126 days.

(21) Appl. No.: 10/276,374

(22) PCT Filed: May 10, 2001

(86) PCT No.: PCT/GB01/02049

§ 371 (c)(1),
(2), (4) Date: Jun. 30, 2003

(87) PCT Pub. No.: WO01/88875

PCT Pub. Date: Nov. 22, 2001

(65) Prior Publication Data

US 2004/0056562 A1 Mar. 25, 2004

(30) Foreign Application Priority Data

May 18, 2000 (GB) .............................................. 0011830

(51) Int. Cl.
*H01L 41/107* (2006.01)

(52) U.S. Cl. ....................................................... 310/318
(58) Field of Classification Search ................. 310/318; 359/676

See application file for complete search history.

(56) References Cited

U.S. PATENT DOCUMENTS

| 4,905,309 A | 2/1990 | Maisonneuve et al. ..... 455/603 |
| 5,436,553 A | 7/1995 | Pepper et al. ............... 323/259 |
| 5,796,890 A | 8/1998 | Tsuji et al. .................... 385/24 |

FOREIGN PATENT DOCUMENTS

| EP | 0898 314 B1 | 11/2001 |
| GB | 2177869 A | 1/1987 |
| JP | 04-265834 | * 9/1992 |

* cited by examiner

*Primary Examiner*—Thomas M. Dougherty
(74) *Attorney, Agent, or Firm*—Fleshner & Kim LLP

(57) ABSTRACT

A remote device such as a control value (4) is powered and controlled by optical energy, supplied by an intensity-modulated light source (8) and optical fiber (10). After conversion into electrical form, the light is detected at (12) and applied to a piezoelectric transformer (14). The output of the transformer powers and control an actuator (16) of the control value.

7 Claims, 1 Drawing Sheet

REMOTE CONTROL AND POWER SYSTEM

Figure 1:
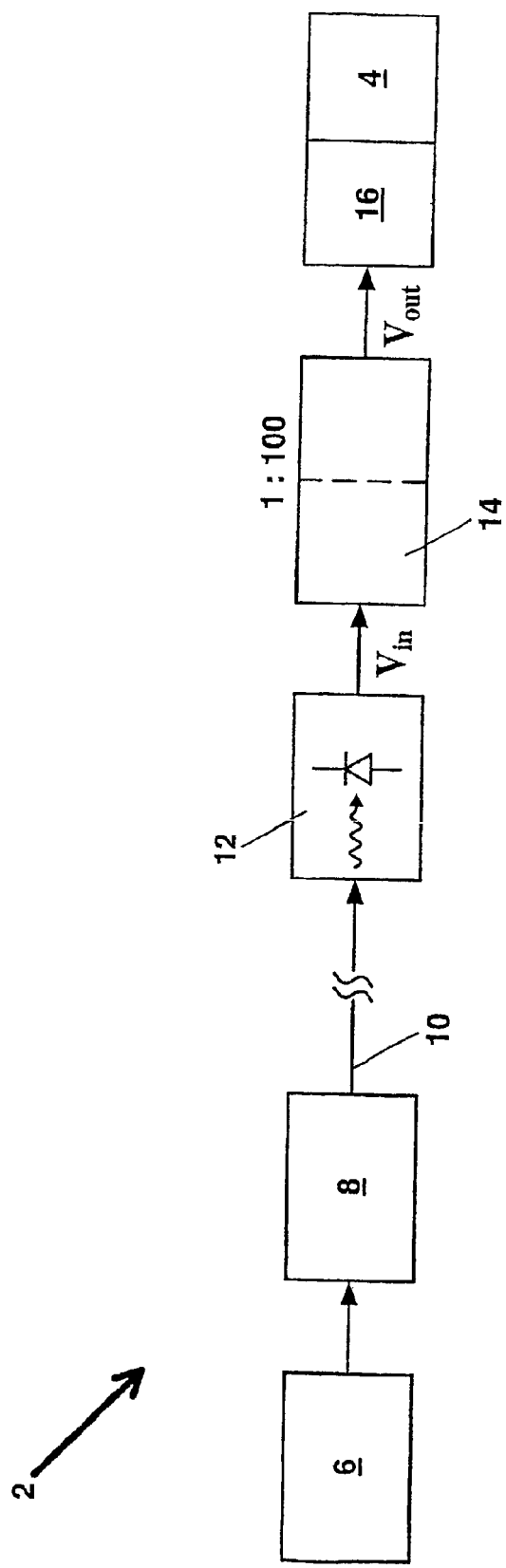

This invention relates to a system for controlling and providing electrical power to an electrical device at a remote point. More especially, although not exclusively, the invention concerns a remote mechanical actuation system for remotely controlling and providing electrical power to a piezoelectric mechanical actuator or micro-machined electrical system.

There are many applications where it is required to provide mechanical movement remote from a control system such as for example the laser tracking mechanism in CD players and control flaps on aircraft to name but two. In almost every system the control system transmits an electrical signal to an electro-mechanical actuator using conductive wires. This electrical signal, which often provides both the electrical power and control information, is converted into a mechanical moment by the electro-mechanical actuator which typically comprises an electric motor, electromagnet, piezoelectric or electrostatic mechanical actuator.

Whilst such an arrangement is perfectly adequate for many applications it does have inherent limitations associated with the conducting wires making it unsuited for certain applications. For example corruption of the electrical signal can arise from electromagnetic induction when the wires are run through electrically and/or magnetically noisy environments. Conversely, when it is required to run the wires through electrically and/or magnetically quiet environments, transmission of the electrical signal can result in the emission of radiation, which can interfere with the operation of other electrical systems in the vicinity of the wires. To operate the electro-mechanical actuator often requires the transmission of high power electrical signals and this can result in the wires having a diameter which is unacceptable in applications where space and/or weight is of prime concern such as for example in aeronautical applications. Furthermore since the wires are typically made of copper they are therefore susceptible to failure by fatigue making then unsuited to high vibration environments. Finally in applications where the control system is a long distance from the actuator, such as for example an oil or gas well valve which can be located several kilometres from the control system (typically the well head), the length of the connecting wires can give rise to additional problems. These include limitations on the electrical signal due to the time constant of the transmission line and resistive loss, both of which decrease the overall system efficiency.

For high reliability, it is preferred that the electro-mechanical actuator has no rubbing surfaces such as bearings or pivots, which are prone to wear and for this reason piezoelectric mechanical actuators are favoured. As is known in order for a piezoelectric actuator to deliver any significant mechanical displacement (e.g. 0.1% strain) this requires the application of roughly 1,000 volts per millimetre of thickness of piezoelectric ceramic material and they are thus inherently high voltage devices. Although the required drive voltage can be decreased by using multiple thin films of piezoelectric material the reliability of the actuator can be compromised. To avoid the need to transmit high voltage signals it is known to transmit the electrical signal as a direct current signal of a few volts and to convert it to a direct current electrical drive signal of between a 100 and 1000 volts using appropriate circuitry. Typically the circuitry comprises an inverter (dc to ac converter) to convert the direct current signal into an alternating current signal, a transformer to step the voltage up to the desired value and a rectification circuit to convert the signal back to a direct current signal. Such circuitry decreases the overall efficiency and reliability of the system.

The present invention has arisen in endeavour to provide a remote mechanical actuation system which in part, at least, overcomes the limitations of the known systems.

According to the present invention there is provided a system for controlling and providing electrical power to an electrical device at a remote point said system comprising: a light source operable to produce an intensity modulated optical signal in response to a control signal, an optical fibre for guiding said optical signal to a photodetector located at said remote point, said photodetector being operable to produce an electrical signal in response to said optical signal and a piezoelectric transformer connected to said photodetector for converting said electrical signal into a higher voltage second electrical signal for controlling and providing power to the electrical device.

Preferably the electrical device comprises a piezoelectric mechanical actuator, micro-machined electrical system or a gallium nitride semiconductor and device.

Advantageously the light source comprises a solid state laser and the optical signal is produced by directly modulating the laser using the control signal. Alternatively the laser is operable to produce a continuous optical output and further comprising optical modulation means operable to modulate said continuous optical output in response to said control signal.

In order that the invention may be better understood a remote mechanical actuation system in accordance with the invention will now be described by way of example only with reference to the accompanying drawing.

Referring to the drawing there is shown a system 2 for remotely controlling and providing electrical power to an aircraft fuel valve 4 to regulate the flow of fuel between the fuel tanks and the engine/s.

The system 2 comprises, in serial connections, a controller 6, a solid state laser 8, an optical fibre 10, a photodetector 12 a piezoelectric transformer 14 and a piezoelectric mechanical actuator 16. The controller 6, which might typically comprise a part of the aircraft's control system, is operable to produce a varying (typically up to 100 kHz) direct current electrical control signal, which as will be described, is used to control and provide electrical power to operate the piezoelectric mechanical actuator 16 which is mechanically coupled to the fuel valve 4. The electrical control signal is used to drive the laser 8 such as to produce an intensity modulated optical signal whose intensity is proportional to the magnitude of the control signal. In the embodiment described the solid state laser is a 980 nm device and produces an optical output of up to 5 W. The output of the laser 8 is coupled into the optical fibre 10, which can be mono-mode or multi-mode, and the optical signal guided by the fibre 10 to the photodetector 12 which converts the optical signal back into a second varying direct current electrical signal.

Typically the photodetector 12 is an array of photodiodes and the second signal has a magnitude of between 3 and 6 volts.

The second electrical signal is applied to the primary of the piezoelectric transformer 14 which transforms the signal into a high voltage, typically 300–600V, varying direct current signal which is used to directly drive the piezoelectric actuator 16. As is known a piezoelectric transformer generally comprises an elongate bar of piezoelectric material, often a ceramic of lead zirconate titanate (PZT), having primary and secondary regions. In operation a varying direct current electrical signal applied to the primary region excites vibrations therein which are mechanically coupled to the secondary region to induce mechanical stress in the region which are in converted back into a varying direct current electrical signal of a different voltage. The voltage multiplication factor of the transformer is determined by the aspect ratio of the output electrode on the secondary region. For the embodiment described, which utilises a bulk piezoelectric actuator rather than a thin film device, the multiplication factor of the transformer is typically more than one hundred times. Unlike a conventional (magnetic) transformer a piezoelectric transformer can directly transform a varying direct current signal into a different voltage varying direct current signal without the need for inversion and rectification.

It will be appreciated that the optically controlled remote mechanical actuation system described has a number of advantages over the known arrangements. Firstly since the control signal is transmitted to the actuator in the form of an optical signal rather than an electrical signal this makes the system intrinsically safe for use in high risk environments and is further immune to interference from external electrical and magnetic fields. For example in the embodiment described the fuel valve 4 will be in close proximity to, or possibly located inside, the aircraft's fuel tank and it is probable that the control lines (optical fibres) will have to be routed through the fuel tanks which are usually distributed throughout the wings. Consequently there is a high risk of explosion should the mechanical actuation system fail or produce sparks. A further advantage of using an optical fibre rather than conducting wires is that they are extremely small and mechanically very robust making them ideally suited to aeronautic or other applications where mass is of prime concern.

Further the use of piezoelectric transformer to directly drive the piezoelectric mechanical actuator offers a number of advantages. Firstly it eliminates the need for the electronic circuitry, inverter and rectifier, normally required when using a conventional magnetic transformer thereby further reducing the system volume and mass. Secondly Piezoelectric transformers are particularly effective where high (>100) voltage multiplication ratios are required as is the case when it is desired to drive a piezoelectric actuator from a low voltage control signal. Additionally they are physically smaller than an equivalent conventional wound transformer and their higher efficiency is preserved irrespective of size and drive frequency. In contrast a conventional magnetic transformer functions less efficiently as the size decreases and frequency increases.

A particular advantage of the system of the present invention is the system's inherent linearity. As it will be appreciated the displacement produced by the actuator is proportional to the magnitude of the high voltage drive signal which in turn is proportional to the intensity of the optical control signal and the magnitude of the original control signal.

It will be appreciated that the system of the present application is not restricted to the specific application described and can accordingly be applied to other applications. In a second example it is envisaged to use the system to control the valves used to regulate the flow of oil and/or gas from wells. After drilling the access hole, these valves are inserted into the pipe where they remain in situ for the life of the oil field, typically 15 years. The temperature of the field can typically be 200° C. and the valve can easily be 20 km or more below the well head. Since an optical fibre typically has a loss of a few tenths of a decibel per kilometre it is practical in such an application to transmit the control and electrical power in the form of an optical signal. Furthermore the piezoelectric transformer and actuator provide the advantage that both are capable of reliable operation up to their curie temperature (up to 400° C.). Typically the photo detector is capable of operation up to 250° C. In contrast the typical well temperatures exceed the upper limit for wound transformers and the associated drive circuitry (even military grade electronic components are usually only rated to 150° C.).

It will be appreciated that modifications can be made to the system described which are within the scope of the invention. Whilst it is convenient to generate the optical signal by directly driving the laser using the control signal it is envisaged in an alternative system to generate the optical signal by operating the laser continuously and modulating its output using an optical modulator or chopper. Furthermore it will be appreciated that since the spectral purity of the optical signal is not critical any light source could be used to generate the modulated optical signal.

Whilst the use of a piezoelectric transformer and actuator combination is particularly preferred, the use of a piezoelectric transformer in this way to enable the efficient transmission of both control information and electric power to an electrical device located at a remote point is considered to be inventive in its own right. Accordingly in other embodiments the system can be used to control and provide electrical power to other forms of actuators or devices which require a high drive voltage such as micro-machined electrical systems (MMS) or a gallium nitride semiconductor device which requires a voltage supply of 100V.

What is claimed is:

1. A system for controlling and providing electrical power to an electrical device at a remote point comprising: a light source operable to produce an intensity modulated optical signal in response to a control signal, an optical fibre for guiding said optical signal to a photodetector located at said remote point, said photodetector being operable to produce an electrical signal in response to said optical signal and a piezoelectric transformer connected to said photodetector for convening said electrical signal into a higher voltage second electrical signal for controlling and providing power to the electrical device.

2. A system according to claim 1 in which the electrical device comprises a piezoelectric mechanical actuator.

3. A system according to claim 1 in which the electrical device comprises a micro-machined electrical system.

4. A system according to claim 1 in which the electrical device comprises a gallium nitride semiconductor device.

5. A system according to any preceding claim in which the light source comprises a solid state laser.

6. A system according to claim 5 in which the optical signal is produced by directly modulating, the laser using the control signal.

7. A system according to claim 5 in which the laser is operable to produce a continuous optical output and further comprising optical modulation means operable to modulate said continuous optical output in response to said control signal.

* * * * *